(12) United States Patent
Kwok

(10) Patent No.: US 10,499,323 B2
(45) Date of Patent: Dec. 3, 2019

(54) INDICATING NETWORK AVAILABILITY IN DUAL COVERAGE REGIONS

(71) Applicant: T-Mobile USA, Inc., Bellevue, WA (US)

(72) Inventor: Ming Shan Kwok, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/907,799

(22) Filed: Feb. 28, 2018

(65) Prior Publication Data

US 2019/0268833 A1   Aug. 29, 2019

(51) Int. Cl.
*H04W 48/16* (2009.01)
*H04W 16/14* (2009.01)
*H04W 84/04* (2009.01)
*H04W 88/10* (2009.01)

(52) U.S. Cl.
CPC .......... *H04W 48/16* (2013.01); *H04W 16/14* (2013.01); *H04W 84/042* (2013.01); *H04W 88/10* (2013.01)

(58) Field of Classification Search
CPC .............................. H04W 48/16; H04W 48/18
See application file for complete search history.

(56) References Cited

U.S. PATENT DOCUMENTS

2012/0184253 A1* 7/2012 Hsu ........................ H04W 4/00
455/414.1
2013/0090118 A1* 4/2013 Jung ................... H04W 36/0005
455/436
2013/0258870 A1* 10/2013 Macias ................ H04W 48/18
370/252
2018/0041897 A1* 2/2018 Prasad ..................... H04W 4/50

FOREIGN PATENT DOCUMENTS

| WO | WO2017034230 | 3/2017 |
| WO | WO2017171354 | 10/2017 |
| WO | WO2017172265 | 10/2017 |
| WO | WO2017196058 | 11/2017 |
| WO | WO2017204539 | 11/2017 |

OTHER PUBLICATIONS

PCT Search Report and Written Opinion dated Apr. 22, 2019 for PCT Application No. PCT/US2019/014012, 11 pages.

\* cited by examiner

*Primary Examiner* — Joshua L Schwartz
(74) *Attorney, Agent, or Firm* — Lee & Hayes, P.C.

(57) ABSTRACT

A wireless communication system may support two types of networks, such as an LTE network and a 5G network. The LTE network is accessed through LTE base stations. The 5G network is accessed through 5G base stations. Because of the more limited availability of 5G base stations, LTE base stations are configured to broadcast information regarding 5G availability. For example, each LTE base station may indicate whether 5G services are available in the geographic area in which the LTE base station is located. Each communication device is configured to receive this information from any LTE base station to which it is attached, and to use the information when determining which of multiple network identifiers to display in the status bar of the device. That is, a communication device displays a 5G symbol in its status bar whenever the communication device receives broadcast information indicating that 5G services are available.

18 Claims, 3 Drawing Sheets

INDICATING NETWORK AVAILABILITY IN DUAL COVERAGE REGIONS

BACKGROUND

Cellular communication devices use various network radio access technologies to communicate wirelessly with geographically distributed base stations. Long-Term Evolution (LTE) is an example of a widely implemented radio access technology, which is used within 4th-Generation (4G) communication systems. New Radio (NR) is a newer radio access technology that is used in 5th-Generation (5G) communication systems. Standards for LTE and NR radio access technologies have been developed by the 3rd-Generation Partnership Project (3GPP) for use by wireless communication carriers within cellular communication networks. Note that the terms 4G and LTE are often used interchangeably when referencing 4G systems. In addition, the terms 5G and NR are often used interchangeably when referencing 5G systems.

A configuration defined by the 3GPP in the 5G/NR specification, referred to as Non-Standalone (NSA), allows the simultaneous use of LTE and 5G systems for communications with a communication device. Specifically, NSA uses Dual Connectivity (DC), in which a user equipment (UE) uses both an LTE radio and an NR radio for downlink receptions and uplink transmissions to corresponding LTE and 5G base stations. An LTE carrier is used for control-plane signaling and for user-plane communications. A 5G carrier is used for additional user-plane bandwidth as well as for data download or transmission throughput. In a scenario such as this, the LTE carrier is said to "anchor" the communication session.

Existing LTE networks use relatively low radio frequencies, such as frequencies in bands below 5 GHz. 5G networks are able to use an extended range of frequency bands compared to LTE, such as higher frequency bands in the 30-300 GHz spectrum. Frequency bands in the 30-300 GHz spectrum are generally referred as mmWave frequency bands as their wavelength (2) is within the millimeter range (1 mm≤x<10 mm) Radio communications using the higher frequency 5G bands can support higher data speeds, but also have disadvantages compared to the lower frequency LTE bands. Specifically, radio signals in the higher frequencies have shorter range and are more easily blocked by physical objects. Accordingly, the ability for a communication device to communicate using higher-frequency 5G bands may be sporadic as the device is physically moved.

Communication devices such as smartphones often have a status bar that shows, among other things, the current signal strength and/or signal quality of the current wireless connection with a base station. In addition, the status bar may have a network indicator, such as an icon or symbol, that indicates the network type being used for the current wireless connection. For example, the network indicator might comprise an "4G LTE" symbol when the current connection is over an LTE network, and a 5G symbol when the current connection is over a 5G network.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are techniques for determining which of multiple network identifiers to display on the status bar of a wireless communication device in a network having areas of dual signal coverage. Network identifiers might include, for example, symbols that indicate 3G, 4G, LTE, 5G, and so forth, corresponding to different wireless network standards.

The described techniques may be useful when a wireless communication device is within an area that is supported by both LTE and 5G technologies, for example. In this situation, 5G signals may be intermittent because of their higher frequencies. 5G signals may also be intermittent as a user moves through different cells, especially in environments where some cells support 5G while others support only LTE.

In embodiments described herein, various cells within a cellular communication system may support LTE, 5G, or both LTE and 5G. In geographic areas where 5G is supported, LTE base stations are configured to broadcast information indicating that the LTE base stations are within areas that are also supported by 5G. This information may be included in an LTE system information block (SIB), which is broadcast repeatedly by each LTE base station over a broadcast channel.

A wireless communication device, often referred to in this environment as user equipment (UE) or mobile station (MS), monitors the broadcast channels of one or more nearby LTE base stations in order to receive SIBs. When a received SIB indicates that 5G is available, the device displays a 5G identifier on its status bar. Otherwise, depending on whether the communication device independently detects 5G coverage, the communication device displays an LTE symbol.

Although the techniques are described in the context of LTE and 5G networks, the techniques described herein may also be used with different network types, standards, and technologies. The techniques may be used more generally for first and second wireless communication networks, where an LTE network is an example of the first wireless communication network and a 5G network is an example of the second wireless communication network.

Figure 1:
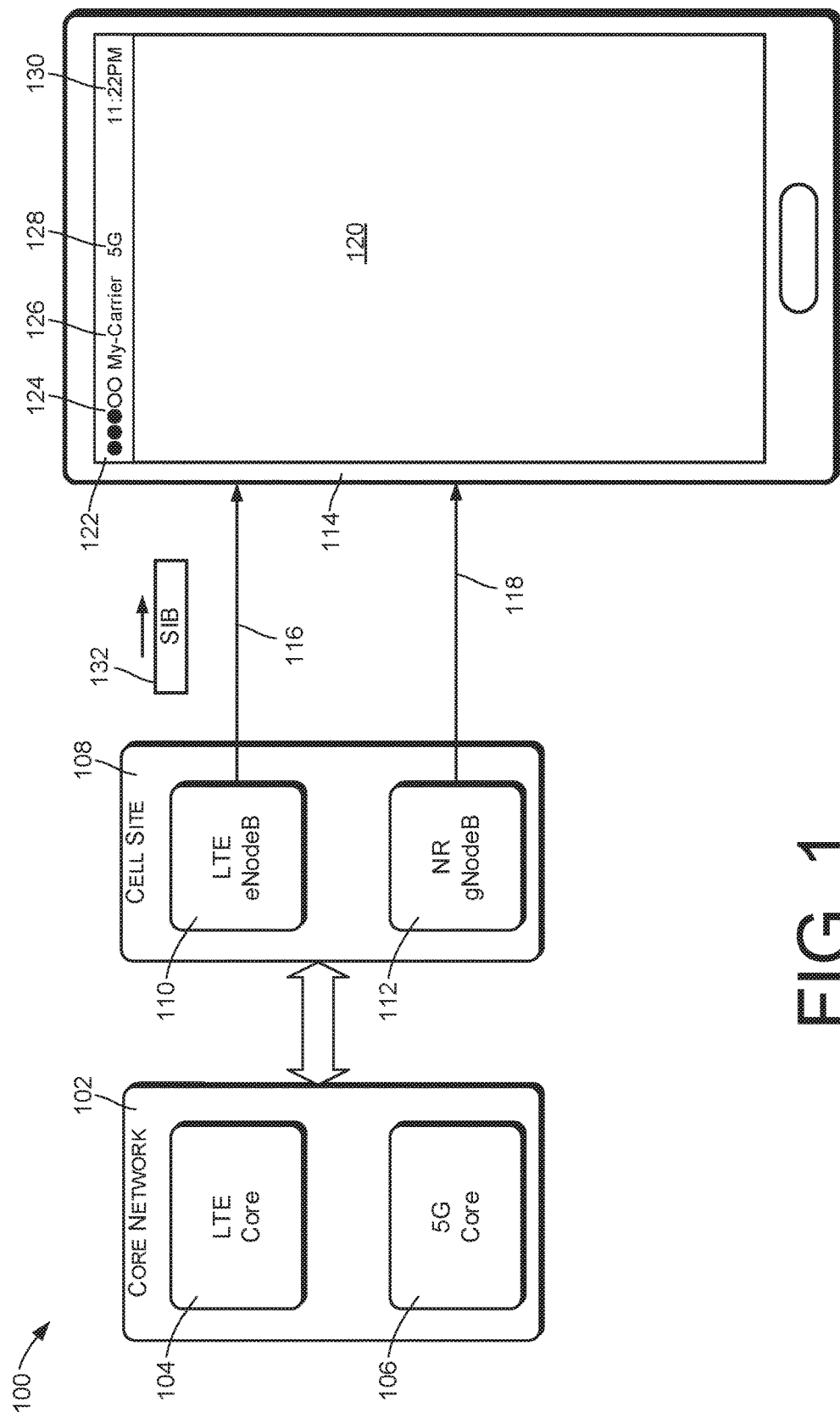
FIG. 1 is a block diagram of a communication network that implements both 4G and 5G technologies.

FIG. 1 illustrates relevant high-level components of a cellular communication system 100. The communication system 100 has a core network 102, which may comprise both a Long-Term Evolution (LTE) network core 104 and a 5th-Generation (5G) network core 106. The communication system 100 also has multiple cell sites 108, only one of which is shown in FIG. 1 for purposes of discussion.

The illustrated cell site 108 supports both 4G and 5G communications, and therefore has both 4G and 5G cellular access points. The 4G access point is implemented as an LTE base station 110, referred to as an eNodeB. The 5G access point is implemented as an NR base station 112, referred to as a gNodeB. The 4G network core 104 communicates with the LTE base station 110 and the 5G network core 106 communicates with the NR base station 112. Other communication paths may be used in other embodiments. Note that some cell sites of the system 100 might lack 5G support, and may support only 4G services and communications.

FIG. 1 shows a single communication device 114, which may be one of many such devices that are configured for use with the communication system 100. In the described embodiment, the communication device 114 supports both LTE and 5G networks and communications. Accordingly, the communication device 114 has an LTE radio (not shown) that communicates wirelessly with the LTE base station 110 of the cell site 108 and an NR radio (not shown) that communicates wirelessly with the NR base station 112 of the cell site 108.

The communication device 114 may comprise any of various types of wireless cellular communication devices that are capable of wireless data and/or voice communications, including smal phones and other mobile devices, "Internet-of-Things" (IoT) devices, smarthome devices, computers, wearable devices, entertainment devices, industrial control equipment, etc. In some environments, the communication device 114 may be referred to as a user equipment (UE) or mobile station (MS).

The communication device 114 may communicate through either or both of the LTE base station 110 and the 5G base station 112. In some cases or embodiments, for example, the communication device 114 may support dual connectivity communications, in which a single communication session might simultaneously use both an LTE connection and a 5G connection. More specifically, the communication device 114 may operate in what is referred to as a Non-Standalone (NSA) configuration, using 5G radio technologies to augment LTE communication capabilities. When using NSA, the communication device 114 uses both an LTE carrier 116 and a 5G carrier 118 for downlink data reception and uplink transmissions. The LTE carrier 116 is used for control-plane messaging and for user-plane communications. The 5G carrier 118 is used, when available, for additional user-plane bandwidth.

In other cases or embodiments, the communication device may communicate solely through the 5G base station 112 whenever possible, and fall back to using solely the LTE base station 110 when 5G communications are not available.

Note that for purposes of discussion, an LTE component is a component that performs according to the LTE standard. An LTE signal or communication is a signal or communication that accords with the LTE standard. A 5G component is a component that performs according to the 5G standard. A 5G signal or communication is a signal or communication that accords with the 5G standard.

Although the communication device 114 is illustrated as communicating through a single cell site 108 using LTE and 5G communications, it may be that in certain situations the LTE communications are through an LTE base station of a first cell site and 5G communications are through a 5G base station of a second, different cell site. A single cell site 108 may include only an LTE base station 110. A single cell site 108 may also include only a 5G base station 112.

The communication device 114 has a display 120 for presenting information and for interacting with a user. A status bar 122 is typically shown at the top of the display 120. In this example, the status bar 122 has a signal strength meter 124, a carrier identifier 126, and a network identifier 128. The status bar 122 also indicates the current time of day in a time field 130.

The signal strength meter 124 shows the strength and/or quality of signals or communication channels that have been established with the LTE base station 110 and/or the NR base station 112. The carrier identifier 126 corresponds to the network carrier or provider whose signals are being used for communications.

The network identifier 128 indicates the type of network that is being used by the communication device 114. More specifically, the displayed network identifier 128 corresponds to and identifies the wireless communication standard that is currently being used for communications by the communication device. In the example described herein, the network identifier indicates LTE when operating in an LTE environment, and 5G when operating in a 5G environment. Other embodiments may of course have different types of networks, corresponding to different communication protocols, and may use symbols corresponding to those communication protocols.

It is generally intended for the status bar 122 to show a network identifier corresponding to the most advanced or highest-capability cellular network that is available for use by the communication device 114. In the system described herein, the symbol for 5G is displayed whenever the communication device is in a geographic area that offers 5G services, including any area that provides both LTE and 5G services.

For purposes of discussion, it is assumed herein that LTE services are more widely available than 5G services. More specifically, the system 100 provides LTE services in multiple geographic areas, and supports 5G services only in some of those geographic areas. As an example, the geographic areas might comprise multiple market areas, and the system 100 may support 5G services in less than all of those market areas. As another example, each of the geographic areas might correspond to a network cell and/or to a signal or coverage area within which signals from a base station are received.

In various situations and/or embodiments, the communication device 114 may establish communications with the core network 102 through either the LTE base station 110 or the 5G base station 112, depending on signal strengths and other factors. In other situations, or in other embodiments, the communication device 114 may implement dual connectivity, in which communications are anchored through the LTE base station 110. When using dual connectivity, 5G communication channels are used in conjunction with LTE communication channels during times when use of 5G communication channels is possible.

The LTE base station 110 is configured to periodically send information, for reception by the communication device 114, regarding capabilities and characteristics of the LTE base station 110. This information may be broadcast for reception by multiple communication devices, and may specify information needed by a communication device to establish bi-directional communications with the LTE base station 110. In the LTE environment, at least some of this information is provided in a periodically broadcast master information block (MIB) and multiple system information blocks (SIBs). FIG. 1 shows a single SIB 132 that is being broadcast by the LTE base station 110. The SIB 132 can be received by multiple communication devices, including the illustrated communication device 114.

In certain implementations, a network availability indicator is included in one of the SIBs that is broadcast periodically by the LTE base station 110. The network availability indicator indicates whether the LTE base station 110 is in a geographic area within which 5G services are available. The communication device 114 uses the network availability indicator to determine whether to display a 5G symbol on the status bar 122. That is, the communication device 114 displays the 5G symbol in the status bar 122 whenever the network availability indicator specifies that 5G services are available. If the network availability indicator is not present in the SIB or does not indicate that 5G services are available, the communication device 114 determines which symbol to display using other information, such as whether a communication channel has been established between the communication device 114 and the 5G base station 112, and/or whether the communication device 114 is able to communicate with or receive broadcast signals from a 5G base station.

Each LTE base station 110 can be individually and separately configured to provide a network availability indicator that indicates whether 5G services are available in the area in which the base station is located. For example, some base stations may be configured to indicate 5G availability, and others may be configured to indicate that 5G is not available. In some cases, certain base stations may not be configured to send the 5G indicator.

Various criteria may be used for determining whether to indicate by the network availability indicator that 5G services are available. In some cases, an LTE base station may indicate 5G availability if the LTE base station is colocated with a 5G base station. In other cases, a network operator may provide 5G generally in a particular geographic market, and all LTE base stations located within that market area might be configured to indicate 5G availability. Each network operator may determine for itself how to use the network availability indicator in a way such that communication devices using the operator's network are able to correctly determine whether 5G services are currently available.

The network availability indicator may be formatted in various ways, depending on implementation details. For example, the network availability indicator might comprise a binary value indicating whether or not 5G services are available. As another example, the network availability indicator might be a variable having possible values corresponding to different network types such as 3G, LTE, 4G, 5G, etc. In this example, the communication device might be configured to display the symbol corresponding to whatever network type is indicated by the network type identifier. In some embodiments, the network type identifier may comprise text corresponding to the network type, such as "LTE" or "5G", and so forth, and this text may be displayed on the status bar 122.

In some embodiments, the network availability indicator may comprise a flag that is included in the SIB when 5G services are available, and omitted from the SIB when 5G services are not available.

Figure 2:
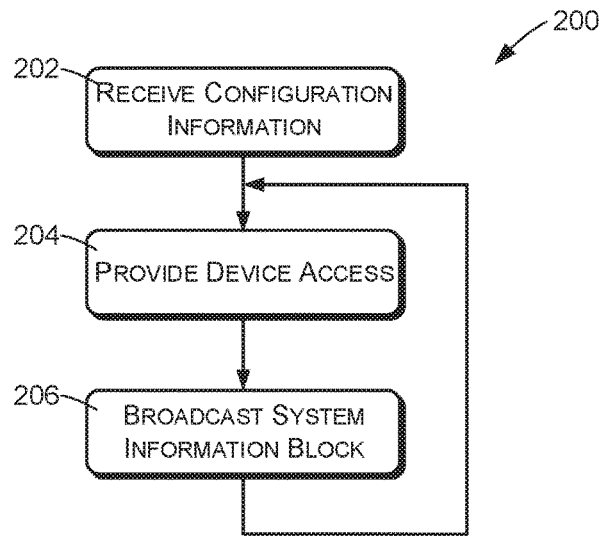
FIG. 2 is a flow diagram illustrating an example method of providing network coverage information to a mobile device or other communication device.

FIG. 2 illustrates an example method 200 that may be performed by an LTE cellular access point in order to inform nearby communication devices regarding networks that are available and that should be identified by the status bars of the communication devices. The example method 200 may be performed in an environment in which a first wireless communication network, such as an LTE network, serves multiple geographic areas, while a second wireless communication network, such as a 5G network, serves only some of the multiple geographic areas. A communication device communicates through a first cellular access point, such as the LTE base station 112, to access the first cellular communication network. The communication device communicates through a second cellular access point, such as the 5G base station 112, to access the second cellular communication network.

The first wireless communication network and the first cellular access point are implemented in accordance with a first wireless communication standard, such as the LTE standard, and are referred to below as an LTE network and an LTE base station, respectively. The second wireless communication network and the second cellular access point are implemented in accordance with a second wireless communication standard, such as the 5G standard, and are referred to below as a 5G network and a 5G base station, respectively.

An action 202 comprises receiving configuration information, including an indication of whether the LTE base station should broadcast the availability of 5G services. The configuration information may be provided, as an example, by the core network 102, based on carrier knowledge of 5G coverage areas. Alternatively, each base station may be manually configured.

An action 204 comprises providing access to the LTE network by one or more communication devices. For example, multiple communication devices might attach to the LTE base station in order to communicate through the LTE base station with the core network of the system.

An action 206 comprises wirelessly sending or broadcasting information, for reception by one or more communication devices, indicating that the receiving devices are within one of the geographic areas served by the second cellular communication network. The action 206 may in some cases comprise specifying, within the broadcast information, whether the LTE base station is within the geographic coverage area of the 5G network. In some cases, the information may indicate whether the LTE base station is collocated with a 5G base station. As another alternative, the information may indicate coverage or non-coverage based on a static configuration of the LTE base station.

In certain embodiments, the information is delivered within an LTE system information block (SIB) that is broadcast by the LTE base station for reception by any communication devices within the signal range of the LTE base station. Generally, an LTE SIB conveys information that is used by communication devices to connect to the LTE network. In the described embodiment, the SIB also contains information regarding 5G availability. In certain embodiments, this information may be included in SIB2 of the LTE communication standard. As an example, the information may be indicated by a flag or other value in the SIB2.

Figure 3:
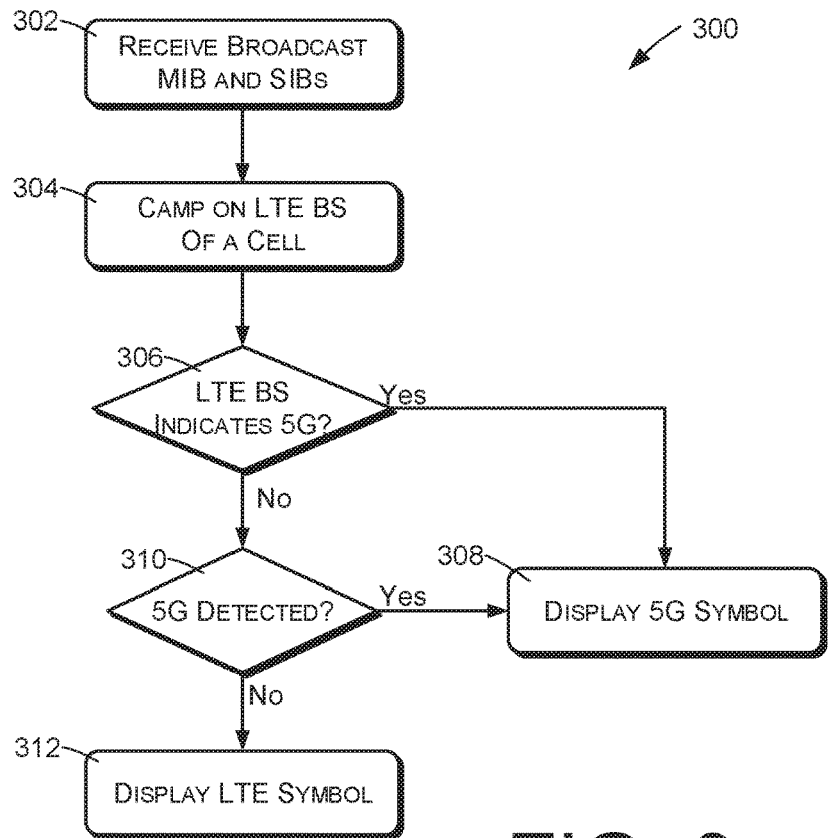
FIG. 3 is a flow diagram illustrating an example method of determining which of two or more networks to indicate as being currently available for use by a mobile device or other communication device.

The actions 204 and 206 are performed periodically, so that the first base station continues to provide communications for attached communication devices and so that the first base station repeatedly broadcasts the SIB. Although not shown, the action 202 may also be repeated at times. Specifically, the core network 102 may at times update the configuration information to indicate a change in the availability of 5G services. 5G availability might change, for example, if there is a 5G outage or if 5G coverage areas are expanded, such as when an NR base station is added to a cell site, FIG. 3 illustrates an example method 300 that may be performed by a communication device, such as a cellular telephone or smartphone, in order to determine which of multiple network identifiers should be displayed in the status bar of the communication device. The example method 300 may be performed in an environment in which a first wireless communication network, such as the LTE network described above, serves multiple geographic areas, while a second wireless communication network, such as a 5G network, serves only some of the multiple geographic areas. The communication device communicates through the LTE base station to access the LTE network. The communication device communicates through the 5G base station to access the 5G network.

An action 302 comprises receiving information over a broadcast channel of the LTE network. In particular, the action 302 comprises receiving the information over a broadcast channel of the LTE base station. In certain embodiments, for example, the information might comprise an LTE master information block (MIB) and one or more LTE system information blocks (SIBs). The MIB and SIBs contain information that is used by the communication device to attach to the LTE base station.

The action 302 might be performed, for example, when the communication device is turned on and scans LTE frequency bands to find a suitable LTE signal, or when the communication device is handed off to a new cell. Once detecting an LTE base station and/or the signal of an LTE base station, the communication device monitors a broadcast channel that is being broadcast by the LTE base station. The communication device obtains the MIB and SIBs from the broadcast channel.

An action 304 comprises camping on or attaching to the LTE base station (BS), based on information received through the MIB and SIBs. As the communication device is moved about, it may camp on or attach to different LTE base stations, after obtaining MIBs and SIBs from those LTE base stations.

An action 306 comprises determining whether broadcast information from the LTE base station indicates that 5G services are available to the communication device and/or that 5G services are generally available in the geographic area within which the communication device is located.

If the information received from the LTE base station indicates that 5G services are available, an action 308 is performed. The action 308 comprises displaying a 5G identifier in the status bar or other display area of the communication device. The 5G identifier can be any symbol that is known to be associated with 5G communications.

If the information received from the LTE base station does not indicate that 5G services are available, an action 310 is performed of detecting or attempting to detect a 5G base station. This might be performed, for example, by detecting an RF signal from a 5G base station and/or a data signal from a 5G base station. In some cases, detection of a 5G base station might be performed by establishing data communications with the 5G base station.

If a 5G base station is detected, the action 308 of displaying the 5G identifier on the communication device is performed. The 5G identifier can be any symbol that is known to be associated with 5G communications or that otherwise identifies the 5G network. If a 5G base station is not detected, an action 312 is performed. The action 312 comprises displaying an LTE identifier in the status bar or other display area of the communication device. The LTE identifier can be any symbol that is known to be associated with LTE communications or that otherwise identifies the LTE network.

The method 300 is repeated as the communication device moves to new cells and corresponding LTE base stations. That is, when camping on an LTE base station, the communication device also obtains the MIB and SIBs from the LTE base station and determines whether this information indicates that 5G services are available.

Figure 4:
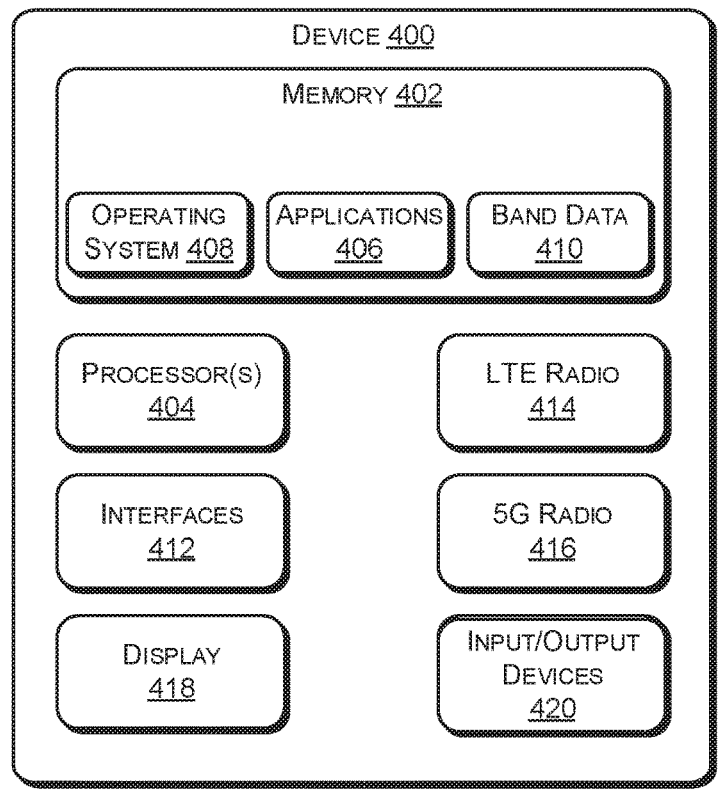
FIG. 4 is a block diagram of an example mobile communication device that may be configured in accordance with the described techniques.

FIG. 4 illustrates an example device 400 that may be used to implement the techniques described herein. The method 300 of FIG. 3, for example, may be implemented by a device such as the device 400.

The device 400 is an example of a communication device 114 as shown in FIG. 1. FIG. 4 shows only basic, high-level components of the device 400.

The device 400 may include memory 402 and a processor 404. The memory 402 may include both volatile memory and non-volatile memory. The memory 402 can also be described as non-transitory computer-readable media or machine-readable storage memory, and may include removable and non-removable media implemented in any method or technology for storage of information, such as computer executable instructions, data structures, program modules, or other data. Additionally, in some embodiments the memory 402 may include a SIM (subscriber identity module), which is a removable smart card used to identify a user of the device 400 to a service provider network.

The memory 402 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information. The memory 402 may in some cases include storage media used to transfer or distribute instructions, applications, and/or data. In some cases, the memory 402 may include data storage that is accessed remotely, such as network-attached storage that the device 400 accesses over some type of data communication network.

The memory 402 stores one or more sets of computer-executable instructions (e.g., software) such as programs that embody operating logic for implementing and/or performing desired functionality of the device 400. The instructions may also reside at least partially within the processor 404 during execution thereof by the device 400. Generally, the instructions stored in the computer-readable storage media may include various applications 406 that are executed by the processor 404, an operating system (OS) 408 that is also executed by the processor 404, and data 410.

In some embodiments, the processor(s) 404 is a central processing unit (CPU), a graphics processing unit (GPU), both CPU and GPU, or other processing unit or component known in the art. Furthermore, the processor(s) 404 may include any number of processors and/or processing cores. The processor(s) 404 is configured to retrieve and execute instructions from the memory 402.

The device 400 may have interfaces 412, which may comprise any sort of interfaces known in the art. The interfaces 412 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

The device 400 may also have an LTE radio 414 and a 5G radio 416, which may be used as described above for implementing dual connectivity in conjunction with an eNodeB and a gNodeB. The radios 414 and 416 transmit and receive radio frequency communications via an antenna (not shown).

The device 400 may have a display 418, which may comprise a liquid crystal display or any other type of display commonly used in telemobile devices or other portable devices. For example, the display 418 may be a touch-sensitive display screen, which may also act as an input device or keypad, such as for providing a soft-key keyboard, navigation buttons, or the like.

The device 400 may have input and output devices 420. These devices may include any sort of output devices known in the art, such as a display (already described as display 418), speakers, a vibrating mechanism, or a tactile feedback mechanism. Output devices may also include ports for one or more peripheral devices, such as headphones, peripheral speakers, or a peripheral display. Input devices may include any sort of input devices known in the art. For example, the input devices may include a microphone, a keyboard/keypad, or a touch-sensitive display (such as the touch-sensitive display screen described above). A keyboard/keypad may be a push button numeric dialing pad (such as on a typical telemobile device), a multi-key keyboard (such as a conventional QWERTY keyboard), or one or more other types of keys or buttons, and may also include a joystick-like controller and/or designated navigation buttons, or the like.

Figure 5:
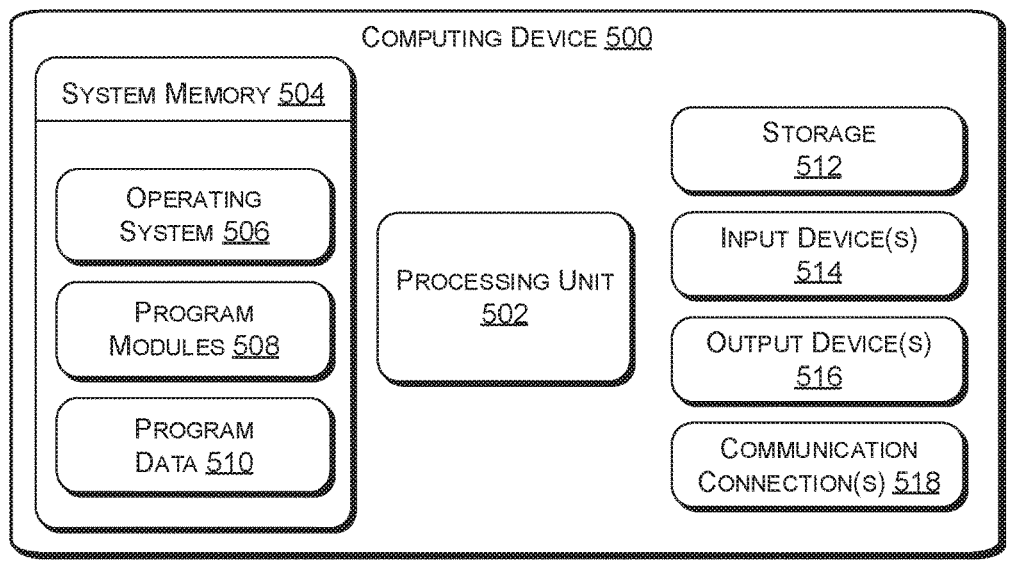
FIG. 5 is a block diagram of a computing device that may be used to implement certain of the techniques described herein.

FIG. 5 is a block diagram of an illustrative computing device 500 such as may be used to implement various components of a core network, a base station, and/or any servers, routers, gateways, administrative components, etc. that may be used by a communication provider. One or more computing devices 500 may be used to implement the core network 102, for example. One or more computing devices 500 may also be used to implement base stations and other components.

In various embodiments, the computing device 500 may include at least one processing unit 502 and system memory 504. Depending on the exact configuration and type of computing device, the system memory 504 may be volatile (such as RAM), non-volatile (such as ROM, flash memory, etc.) or some combination of the two. The system memory 504 may include an operating system 506, one or more program modules 508, and may include program data 510.

The computing device 500 may also include additional data storage devices (removable and/or non-removable) such as, for example, magnetic disks, optical disks, or tape. Such additional storage is illustrated in FIG. 5 by storage 512.

Non-transitory computer storage media of the computing device 500 may include volatile and nonvolatile, removable and non-removable media implemented in any method or technology for storage of information, such as computer readable instructions, data structures, program modules, or other data. The system memory 504 and storage 512 are all examples of computer-readable storage media. Non-transitory computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such non-transitory computer-readable storage media may be part of the computing device 500.

In various embodiment, any or all of the system memory 504 and storage 512 may store programming instructions which, when executed, implement some or all of the function functionality described above as being implemented by components of the core network 102.

The computing device 500 may also have input device(s) 514 such as a keyboard, a mouse, a touch-sensitive display, voice input device, etc. Output device(s) 516 such as a display, speakers, a printer, etc. may also be included. The computing device 500 may also contain communication connections 518 that allow the device to communicate with other computing devices.

Although features and/or methodological acts are described above, it is to be understood that the appended claims are not necessarily limited to those features or acts. Rather, the features and acts described above are disclosed as example forms of implementing the claims.

What is claimed is:

1. A communication device for use in a cellular communication system, the communication device comprising:
   one or more processors;
   one or more non-transitory computer-readable media storing computer-executable instructions that, when executed by the one or more processors, cause the one or more processors to perform actions comprising:
      receiving, from a first base station of a first communication network, information over a broadcast channel of the first base station;
      determining whether the information indicates that services of a second wireless communication network are available;
      in response to determining that the information indicates that the services of the second wireless communication network are available, displaying a symbol on the communication device, wherein the symbol identifies the second wireless communication network;
      receiving, from a second base station of the first wireless communication network, further information over a broadcast channel of the second base station;
      determining whether the further information indicates that the services of the second wireless communication network are available;
      in response to determining that the further information does not indicate that the services of the second wireless communication network are available:
         detecting a third base station that is associated with the second wireless communication network; and
         in response to detecting the third base station, displaying the symbol on the communication device.

2. The communication device of claim 1, further comprising receiving a system information block (SIB) over the broadcast channel, wherein the SIB specifies the information.

3. The communication device of claim 1, wherein:
   the first wireless communication network is a Long-Term Evolution (LTE) network; and
   the second wireless communication network is a 5th-Generation (5G) network.

4. The communication device of claim 1, further comprising receiving a system information block (SIB) over the broadcast channel, wherein the SIB specifies the further information.

5. A cellular communication system comprising:
   a first wireless communication network implemented in accordance with a first wireless network standard;

a second wireless communication network implemented in accordance with a second wireless network standard;

wherein the first wireless communication network serves multiple geographic areas and the second wireless communication network serves one or more of the multiple geographic areas;

a first base station associated with the first wireless communication network;

a second base station associated with the first wireless communication network;

a third base station associated with the second wireless communication network;

the first base station being configured to perform actions comprising:
  providing access to the first wireless communication network by one or more communication devices; and
  first wirelessly sending information for reception by at least one communication device, wherein the information indicates whether the at least one communication device is within the one or more of the multiple geographic areas served by the second wireless communication network;

the second base station being configured to perform actions comprising:
  providing access to the first wireless communication network by the one or more communication devices; and
  second wirelessly sending further information for reception by at least one communication device, wherein the further information indicates whether the at least one communication device is within the one or more of the multiple geographic areas served by the second wireless communication network; and the third base station being configured to perform actions comprising:
  third wirelessly sending at least one of an RF signal or a data signal in accordance with the second wireless network standard; and
  establishing data communications with at least one communication device.

6. The cellular communication system of claim 5, further comprising broadcasting a system information block (SIB), wherein the SIB specifies the information.

7. The cellular communication system of claim 5, wherein the first wirelessly sending comprises wirelessly broadcasting the information for reception by multiple communication devices.

8. The cellular communication system of claim 5, wherein the second wireless communication network serves less than all of the multiple geographic areas.

9. The cellular communication system of claim 5, wherein the one or more communication devices are configured to display a symbol corresponding to the first wireless network standard in response to the information indicating that the one or more communication devices are within the one or more of the multiple geographic areas.

10. The cellular communication system of claim 5, wherein:
  the cellular communication system serves multiple market areas; and
  each of the multiple geographic areas comprises one of the market areas.

11. The cellular communication system of claim 5, wherein each of the multiple geographic areas comprises an area of a network cell.

12. The cellular communication system of claim 5, wherein each of the multiple geographic areas comprises a signal area within which signals from the base station are received.

13. The cellular communication system of claim 5, wherein:
  the base station is a Long-Term Evolution (LTE) base station; and
  the information indicates whether the at least one communication device is within a coverage area of a 5th Generation (5G) base station.

14. The cellular communication system of claim 5, wherein:
  the base station is a Long-Term Evolution (LTE) base station; and
  the information indicates whether a 5th Generation (5G) base station is colocated with the LTE base station.

15. The cellular communication system of claim 5, further comprising broadcasting a system information block (SIB), wherein the SIB specifies the further information.

16. The cellular communication system of claim 5, wherein the second wirelessly sending comprises wirelessly broadcasting the further information for reception by multiple communication devices.

17. The cellular communication system of claim 5, wherein:
  the base station is a Long-Term Evolution (LTE) base station; and
  the further information indicates whether the at least one communication device is within a coverage area of a 5th Generation (5G) base station.

18. The cellular communication system of claim 5, wherein:
  the base station is a Long-Term Evolution (LTE) base station; and
  the further information indicates whether a 5th Generation (5G) base station is colocated with the LTE base station.

* * * * *